Feb. 27, 1962

C. N. CAMPBELL, JR 3,022,841

FILLING MACHINES

Filed June 2, 1958

INVENTOR.
Claude N. Campbell, Jr.
BY
Paul & Paul
ATTORNEYS.

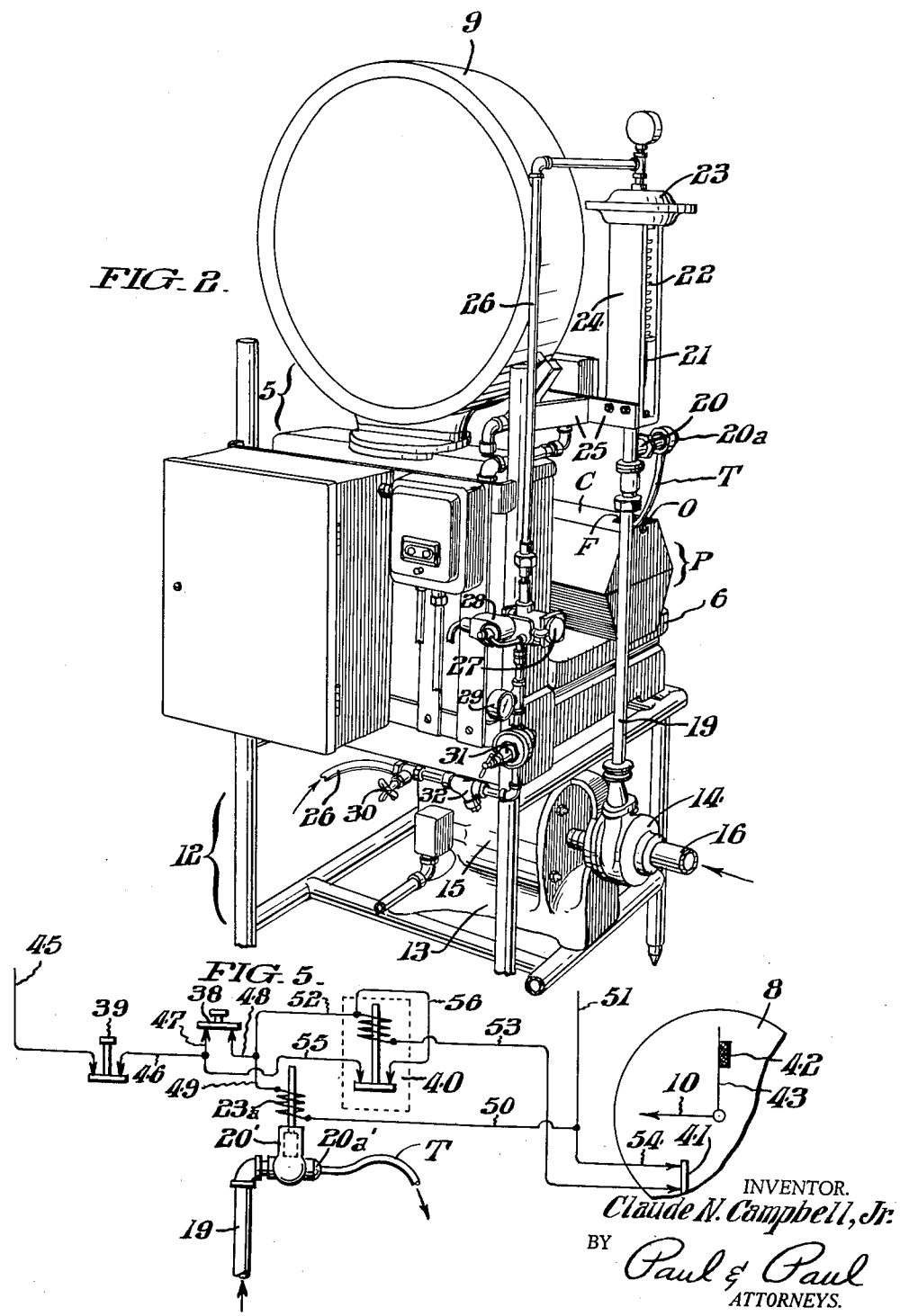

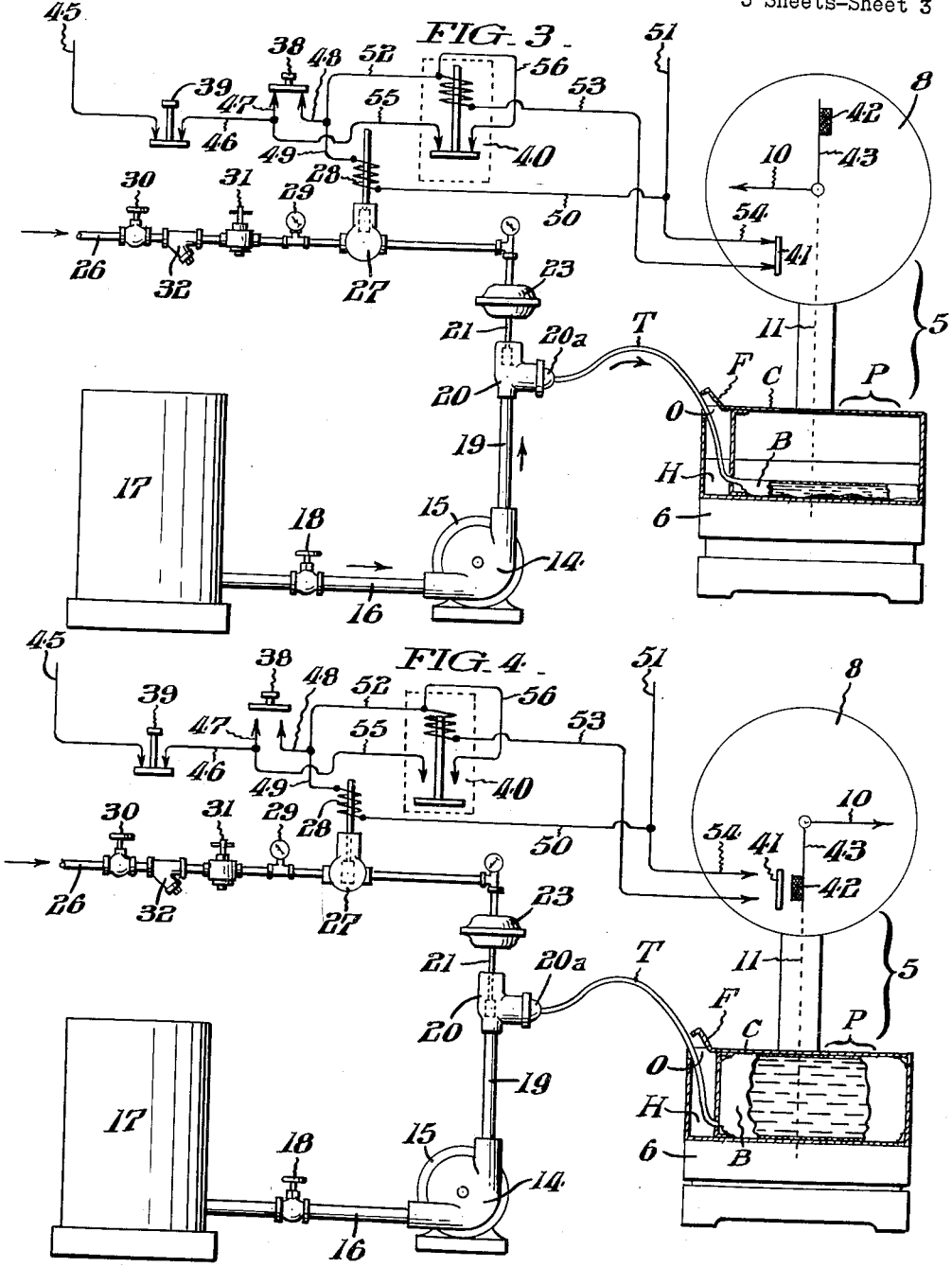

3,022,841
FILLING MACHINES

Claude N. Campbell, Jr., Edgewater Park, N.J., assignor to Weyerhaeuser Company, a corporation of Washington Filed June 2, 1958, Ser. No. 739,354
1 Claim. (Cl. 177—80)

This invention relates to filling machines. More specifically, it is concerned with filling machines for charging receptacles or containers with liquid commodities such for example, as milk by weight measurement in bulk quantities for subsequent dispensing of the liquids from the receptacles after delivery to bakeries or restaurants.

My invention has for its chief aim, the provision of a machine, for the above purpose, which is simple in construction and reliable in operation; and which upon being started under manual control after placement of a receptacle therein, is automatically stopped after a pre-determined charge of the liquid has been introduced into the container.

Other objects and attendant advantages will appear from the following detailed description of the attached drawings, wherein:

FIG. 2 is a similar view showing the apparatus as seen from the rear.

FIGS. 3 and 4 are diagrammatic views showing the facilities by which the operation of the machine is controlled; and FIG. 5 is a view similar to FIG. 3 showing a modified arrangement of the control facilities.

Figure 1:
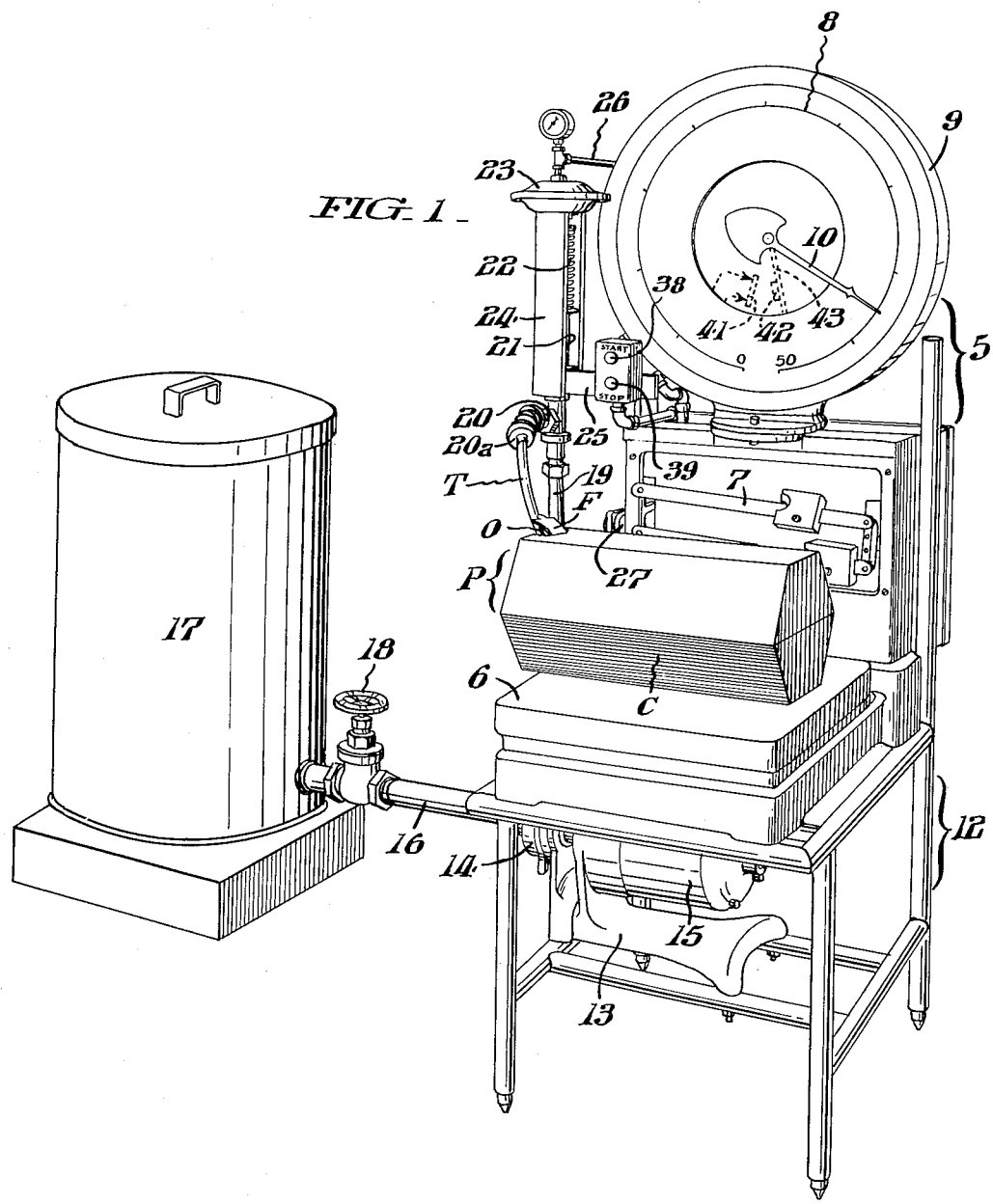
FIG. 1 is a perspective view of a filling machine conveniently embodying my invention as seen from the front.

The weighing scale comprehensively designated by the numeral 5 in these illustrations is of a well known commercial type having a platform 6, a pivoted beam 7, a graduated indicating dial 8 within a circular casing 9, and a coordinating pointer 10 which latter is mechanically connected, as diagrammatically indicated by the broken line 11 in FIGS. 3 and 4, to the platform 6.

To adapt the weighing scale to the purpose of my invention I have provided a supporting stand 12 whereon the scale is sustained with its platform 6 at table height. Affixed to cross bars in the lower part of the frame 12, is a bracket 13 which supports a low pressure rotary pump 14 and an electric driving motor 15 therefor, the inlet of said pump being connected by a conduit 16 to a supply reservoir 17 for the milk or other liquid which is to be weight metered, the rate of flow through said conduit being controllable by means of an interposed hand valve 18. Extending upward from the outlet of the pump 14 is a delivery pipe 19 which terminates in a valve 20 whereof the stem 21 is arranged to be actuated, against the pressure of a spring 22, by a pneumatic diaphragm motor 23.

As shown, the diaphragm motor 23 is fixedly mounted upon the top of a small open housing 24 supported by a bracket arm 25 on one of the uprights of the frame 11. Leading from a source of compressed air (not illustrated) is a pipe 26 which connects into the top of the diaphragm motor 23, and in which are interposed a flow control valve 27 having an actuating solenoid 28, a pressure gauge 29, a manual shut off valve 30, a pressure regulator 31 and, in the interval between said valve 30 and said regulator 31 a trap 32.

For control of the machine I have provided, as diagrammatically shown in FIGS. 3-5, electrical instrumentalities including manual start and stop switches 38 and 39, a relay 40, and a mercury switch 41. This mercury switch is normally closed and positionally adjustable about the path of the dial pointer 10 of the indicator dial 8, and is adapted to be opened, as later on more fully explained, by a magnet 42 on an arm 43 secured to arbor of the pointer of said indicator. The start and stop switches 38 and 39 are interposed in a circuit 45, 46, 47, 48, 49, 50, 51 in which the actuating solenoid 28 of the air valve 27 is also included. The actuating coil of the relay switch 40 and the mercury switch 41 are interposed in series in a branch circuit 52, 53, 54; while the contacts of the relay switch are disposed in a circuit 55, 56 shunted across the terminals of the manual start switch 38. By reference to FIG. 1, it will be noted that the start and stop switches 38 and 39 are contained in a housing affixed to the bracket 25 hereinbefore referred to for convenience of ready access to the user of the machine.

Operation

In the use of the machine, a package P (FIGS. 1 and 2) to be filled is placed on its side upon the platform 6 of the machine, said package being shown as comprising an elongated flatsided prismatic carton C of pasteboard or the like having a liner bag B therein of thin flexible plastic sheet material with a filling tube T of rubber, or the like, extending from one end thereof. The carton C has a flap F which is retractable from an opening O through which the tube T can be withdrawn. It is to be understood that the liner bag B is completely collapsed when the package P is placed upon the platform. With the package so placed, the end of the tube T is engaged over an outlet nipple 20a on the valve 20. The scale tare is then set for predetermined weight of the empty package and of the liquid with which the liner bag B is to be filled.

All being now in readiness and considering the pump to be running and the stop switch 39 closed, the start button 38 is momentarily depressed as in FIG. 3. As a consequence, electric current will flow through the circuit 45, 46, 47, 48, 49, 50, 51 to energize the coil of the actuating solenoid 28 of the air valve 27 to close said valve for admission of compressed air to the diaphragm motor 23. The valve 20 is thereby opened and liquid is permitted to flow by way of the tube T into the liner bag B of the package P on the scale platform 6. At the same time, electric current will flow through the circuit 45, 46, 47, 48, 52, 53, 54, 51 to energize the coil of the relay switch 40 causing the latter to close and establish the shunt circuit 55, 56, whereupon the circuit 45, 46, 55, 56, 53, 54, 51 will be maintained upon the release of the start switch 38, with attendant continuation of flow of the liquid into the liner bag B of the package P. As the weight of the package P increases, the scale platform 6 gradually recedes downwardly with incidental clockwise rotation of the hand 10 of the indicator 8 and the associated arm 43 until said arm reaches the position shown in FIG. 4, whereupon, by action of the magnet 42, the mercury switch 41 is opened. Under these conditions current flow through the coil of relay 40 is instantaneously interrupted to cause closing of the air valve 27 and, in turn, of the valve 20 in the pipe 19 to stop delivery of liquid into the package P as will be readily understood from FIG. 4. After the liner bag B of the package P is thus filled, the tube T is disconnected from the nipple valve 20. Finally, the end of the tube T is stoppered or otherwise sealed, tucked into the hollow H provided for it in one end of the package carton C, and the flap F closed over the opening O. Upon removal of the filled package and rise of the scale platform 6, the pointer hand 10 and the associated arm 43 are automatically returned, through the medium of the connection 11, to the original position in which they are shown in FIG. 3 in readiness for the filling of another package in the same way as above described.

In the modification illustrated in FIG. 5, a solenoid actuated valve 20' is utilized in the liquid delivery pipe 19 in lieu of the pneuamtically actuated valve 20, the first described embodiment of my invention. As shown, the coil of the solenoid 23a of the valve 20' is here interposed in the circuit 45, 46, 47, 48, 49, 50, 51 in the same manner as the actuating solenoid 28 of the air valve 27, in the first embodiment, and it is therefore believed that the operation of the modification will be obvious from FIG. 5 without the necessity for separate detaled explanation. In either instance, it will be seen that the machine can be stopped at any time simply by depressing the stop switch 39.

The apparatus can of course be utilized in filling receptacles other than of the type herein disclosed by way of example.

While in accordance with the provisions of the statutes, I have illustrated and described the best forms of embodiment of my invention now known to me it will be apparent to those skilled in the art that changes may be made in the form of the apparatus described without departing from the spirit and scope of the invention, as set forth in the appended claim, and that in some cases certain features of my invention may be used to advantage without a corresponding use of other features.

Having thus described by invention, I claim:

In a filling machine, the combination of a weighing scale having a platform for placement thereon of a container to be charged with a liquid, a pointer for coordination with an indicator dial, and an operating connection between the platform and the pointer; a frame upon which said scale is mounted; a source of liquid supply; a continuously driven low pressure pump for drawing liquid from said source of supply; said pump being mounted on said frame below said scales; a motor for driving said pump operatively connected to said pump; a first delivery conduit leading from said source of supply to said pump, a valve in said first conduit for regulating the flow through said conduit, a second delivery conduit leading from the pump and terminating in a normally closed valve adjacent the scale platform at a level thereabove and operable by a pneumatic diaphragm motor; a housing mounted on said frame, said housing supporting said diaphragm motor; a pipe leading from a compressed air source to the diaphragm motor; a solenoid-operable valve spring biased to a normally closed position in the air pipe; said pipe further including a pressure gauge, a pressure regulator, a shutoff valve, and a trap between said regulator and said solenoid-operable valve; a normally-closed control switch positionally adjustable about the path of the dial pointer and adapted to be opened by a magnet carried by the pointer; a relay having a coil and switch terminals; a manual start switch; an electrical circuit including said start switch, relay coil and normally-closed control switch connected in series; an auxiliary circuit connecting said relay switch terminal across said manual start switch; means connecting the solenoid of said solenoid-operable valve in said electrical circuit for electrical energization whenever said relay coil is electrically energized; whereby upon closing the start switch the relay is operated and the solenoid-operated valve is opened for actuation of the diaphragm motor to open the liquid discharge valve and the latter is held open after release of the start switch, and whereby the liquid discharge valve is automatically closed upon eventual opening of the control switch by the magnet on the pointer, a normally-closed manual stop switch connected in series with said manual start switch; a flexible outlet nipple attached to the outlet of said normally-closed valve.

References Cited in the file of this patent
UNITED STATES PATENTS

| | | |
|---|---|---|
| 2,067,743 | Weckerly | Jan. 12, 1937 |
| 2,100,874 | Ryan et al. | Nov. 30, 1937 |
| 2,232,404 | Pratt | Feb. 18, 1941 |
| 2,249,368 | Weckerly | July 15, 1941 |
| 2,545,118 | St. Clair | Mar. 13, 1951 |
| 2,566,210 | Kendall et al. | Aug. 28, 1951 |
| 2,580,567 | Martin | Jan. 1, 1952 |
| 2,776,103 | Bradley | Jan. 1, 1957 |

FOREIGN PATENTS

| | | |
|---|---|---|
| 921,106 | Germany | Dec. 9, 1954 |